United States Patent [19]

Fowler

[11] Patent Number: 5,067,978

[45] Date of Patent: Nov. 26, 1991

[54] METHOD FOR THE REMOVAL OF LEAD FROM WASTE PRODUCTS

[76] Inventor: Benjamin P. Fowler, 805 S. Country Club, LaPorte, Tex. 77057

[21] Appl. No.: 568,861

[22] Filed: Aug. 17, 1990

Related U.S. Application Data

[63] Continuation-in-part of Ser. No. 539,992, Jun. 18, 1990, which is a continuation-in-part of Ser. No. 398,246, Aug. 24, 1989, Pat. No. 4,934,286.

[51] Int. Cl.[5] .................. C03B 5/08

[52] U.S. Cl. .................. 65/134; 65/32.5; 65/136; 422/168; 501/155

[58] Field of Search .................. 65/27, 134, 136, 32.5; 501/155; 422/168

[56] References Cited

U.S. PATENT DOCUMENTS

| | | | |
|---|---|---|---|
| 4,149,866 | 4/1979 | Austin et al. | 65/32.5 X |
| 4,666,490 | 5/1987 | Drake | 65/27 |
| 4,678,493 | 7/1987 | Roberts | 65/134 |
| 4,820,325 | 4/1989 | Wheeler | 65/27 |
| 4,944,785 | 7/1990 | Sorg et al. | 501/155 X |
| 4,988,376 | 1/1991 | Mason et al. | 65/134 |

*Primary Examiner*—Robert L. Lindsay

*Attorney, Agent, or Firm*—Harrison & Egbert

[57] ABSTRACT

A process for the removal of lead from a waste product comprising the steps of delivering silica to a combustion chamber, heating the silica within the combustion chamber to a temperature of greater than 1500° F., mixing a lead-containing waste with the heated silica so as to form a leaded glass, and removing the leaded glass from the combustion chamber. The silica material is sand. The process further includes the step of removing oxygen from the chamber prior to the step of heating. The oxygen is removed by injecting an inert gas into the chamber so as to displace oxygen from the chamber. The silica is heated to a temperature suitable for forming molten glass. The remaining constituents of the waste product are heated so as to become diassociated gaseous components.

10 Claims, 2 Drawing Sheets

METHOD FOR THE REMOVAL OF LEAD FROM WASTE PRODUCTS

RELATED APPLICATIONS

The present application is a continuation-in-part of U.S. Pat. application Ser. No. 07/539,992, filed on June 18, 1990, and entitled "Apparatus and Method for Heating a Waste Disposal System", presently pending. U.S. Application Ser. No. 07/539,992 is a continuation-in-part of U.S. Ser. No. 07/398,246, filed Aug. 24, 1989, now U.S. Pat. No. 4,934,286, issued on June 19, 1990 and entitled "Apparatus and Method for the Disposal of Waste".

TECHNICAL FIELD

The present invention relates to apparatus and methods for the disposal of waste. More particularly, the present invention relates to apparatus and methods for the removal of lead from lead-containing unsafe products.

BACKGROUND ART

Garbage and waste are produced in communities in great quantities. This garbage and waste must be disposed of in a variety of ways. The disposal of various kinds of garbage and waste in large quantities in cities is one of the important new administrative problems facing city government. Typical methods for the disposal of garbage include discharging garbage into the sea for reclamation and burying garbage underground. However, there are great problems, such as pollution of sea water and difficulty in getting land, associated with these methods. The general trend at present is directed toward the disposal of garbage by complete incineration. However, and unfortunately, the prevailing technique for the disposal of garbage is by incineration, a method used which burns garbage on fire grates with large quantities of air supplied, thus creating a number of associated problems.

It has been found that the use of large quantities of air produces large quantities of exhaust gases, thereby creating and exacerbating air pollution. Since the combustion temperature of garbage is relatively low, the residue of burnt garbage cannot be made completely harmless. A great deal of environmental pollution is caused by such effluents from this incineration process. Since the combustion of garbage on fire grates is unstable, the efficiency of heat recovery is low and it is difficult to effectively use the heat generated by the combustion and garbage. Additionally, vast space is occupied by the fire grates. This requires a large area for the combustion site. Furthermore, there is a difficulty in getting the sites for the construction of large incinerating plants because of the environmental problems associated therewith.

Recently, disposal methods have been proposed which attempt to solve some of the problems associated with thermal decomposition. Essentially, the garbage is introduced into an incinerator with the heat necessary for thermal decomposition so as to produce a generated slag and gas. There are two processes that are available—a process which uses external heat as an intense heat source necessary for thermal decomposition and a process which utilizes heat generated by the partial oxidation of the garbage with air or oxygen supplied. In the former process, since an external heat is used, the problem lies in economy. In the latter process, since combustion gas gets mixed with generated gas, the calorific value of generated gas is decreased, disadvantageously making the usefulness of the generated gas inferior to that of the former process.

Another problem facing city governments is the disposal of toxic or hazardous materials, such as polychlorinated biphenyls (PCB's). These are toxic and hazardous compounds whose use is being withdrawn or prohibited because of the irreversible harm to the health and the environment. These materials must be managed and disposed of effectively. In addition to polychlorinated biphenyls, there are also organophosphorous, organonitrogen, and organometallic compounds, as well as other materials, that exist in massive quantities and demand effective means of disposal. The majority of the toxic compounds are in a complex matrix format often combining organic and inorganic compounds or fractions, and in these cases, little or no disposal technology is available.

Various methods have been used for disposing of these toxic wastes, including thermal destruction, chemical detoxification, long-term encapsulation and specific landfill methods. With the exception of high temperature incineration, little success has been demonstrated for the safe disposal of highly toxic or extremely persistent waste, such as PCB's. The methods that have been tried have either not been able to handle anything but homogenous waste feed streams or they have only been able to handle relatively low concentrations of toxic compounds in the waste materials. Further, very few of the disposal methods tried to date have been able to develop to operate on a commercial scale.

Of the many methods tried for the disposal of toxic or hazardous wastes, thermal destruction has been the most promising. However, the toxic waste materials are usually very stable organic molecules, and they require long dwell times at high temperatures to effect thermal destruction. Some combustion or incineration systems can achieve the necessary conditions, but the facilities required are very large scale, and often the products of the combustion process present as much of a disposal problem as the original toxic wastes.

In the past, attempts have been made to use electric plasma arcs to destroy toxic wastes. An electric plasma arc system, being essentially pyrolytic, overcomes many of the deficiencies of an incineration or combustion process. The volume of gaseous products produced is much less. As a result, the equipment is substantially smaller in scale. Laboratory demonstrations have shown that a plasma arc is capable of atomizing and ionizing toxic organic compounds, and these atoms and ions usually recombine into simple products. While residual toxic materials are formed, these can be captured, so that no significant amount of toxic material is released to the environment.

Unfortunately, such pyrolytic destruction of waste materials is not suitable for a commercially viable system. Often, the gaseous products that are released into the environment can contribute to various forms of air pollution. In addition, the release of such gases causes concern among the various regulatory authorities in control of the destruction of such toxic materials. Furthermore, and importantly, such plasma arc, pyrolytic methods of waste destruction are extremely costly processes. The cost of the power needed to operate lasers, plasma arcs, or various other methods, cannot be justified on a large scale garbage disposal basis. Furthermore, the by-products of the combustion process are not acquired for later sale or cost offset.

Various United States patents have attempted to address the issue of waste disposal by high temperature incineration process. U.S. Pat. No. 4,665,841, issued on May 19, 1987, describes a municipal trash destruction system in which hydraulic systems move the rubbish, garbage, and other municipal trash into a processor. The processor includes a trash processing zone, a fractionating system, a combustion zone, a heating exchange zone, a waste heat recovery system, and a precipitator for cleaning the emissions prior to release into the atmosphere. U.S. Pat. No. 4,644,877, issued on Feb. 24, 1987, describes the pyrolytic destruction of toxic and hazardous waste materials. The waste materials are fed into a plasma arc burner where they are atomized and ionized. These materials are then discharged into a reaction chamber to be cooled and recombined into product gas and particulate matter. The product gas is then extracted from the recombining products using a scrubber. The product gas may then be burned and utilized as a fuel. U.S. Pat. No. 4,695,448, issued on Sept. 22, 1987, describes the dissociating of toxic compounds by an electric arc (e.g. 12,000° F.) in an airtight chamber charged with oxygen. U.S. Pat. No. 4,759,300, issued on July 26, 1988, shows a method and apparatus for the pyrolysis of waste products. In this invention, the waste materials to be pyrolyzed are efficiently dehydrated prior to introduction into the pyrolysis retort using microwaves generated by a large microwave generator. After the waste material is dried, the initial ignition of the material is accomplished by using a high intensity laser beam. Laser ignition is continued until sufficient methane and other volatile gases are produced for burning in a burner unit to sustain the pyrolysis reaction. U.S. Pat. No. 4,667,609, issued on May 26, 1987, describes the destruction of soil contaminated with hydrocarbons by passing the material through a sealed, negatively pressurized, high temperature furnace. The temperature in one zone of this process is maintained at 2,900° F. so as to effectively destroy the contaminating hydrocarbons. U.S. Pat. No. 3,575,119 shows an apparatus for disintegrating and incinerating a concentrated slurry of solid organic material. Material passes through an arcuate tunnel having a plurality of arc electrodes spaced therealong. These electrodes cause the temperature to abruptly raise from about 2,000° F. to about 15,000° F. so as to dissolve the bonds between the carbon and the other atoms.

In the past, various techniques have been used to create high temperature burning systems. Typically, these rely on vast quantities of fuel. It has been found that the expense of attaining such destruction of waste could not justify the technique for the destruction of waste. Whenever vast quantities of fuel are required to attain a desired temperature, the cost of such fuel becomes an important consideration when evaluating the merits of a waste disposal system. As such, it was difficult to justify the benefits of the pyrolysis of waste since the cost of such waste destruction is so expensive.

Various U.S. patents have attempted to create large temperatures by the dissociation of water. For example, U.S. Pat. No. 4,848,250, issued on July 18, 1989 to J.M. Wunderley, describes a refuse container in which refuse is injected into an ignition chamber so as to ignite a readily burnable material. Water in the refuse reacts with the carbon to produce a hydrogen gas. The gas is passed to a secondary chamber wherein the hydrogen is burnt, resulting in an increase in temperature to above 3,000° F. and producing water. Because of this high temperature, the water dissociates into hydrogen and oxygen. The hydrogen burns repeatedly and forms water and hydrogen in rapid succession, thereby generating thermal energy devoid of particulate matter. At high temperatures, water is dissociated into its hydrogen and oxygen components. This spontaneous occurrence keeps the system operating at temperatures of above 3000° F. This does not use the combination of oxygen and hydrocarbons.

U.S. Pat. No. 4,132,065, issued on Jan. 2, 1979 to R. McGann describes a system in which a free-oxygen containing gas is heated while under pressure in a gas-fired pressurized heater and then reacted with a hydrocarbonaceous fuel. The system is designed to produce a $H_2$+CO-containing product gas. One portion of the product gas is reacted in the pressurized heater with air in order to heat the free-oxygen containing gas going into the gas generator.

U.S. Pat. No. 4,242,076, issued on Dec. 30, 1980, to E. Rawyler-Ehrat, describes a process of combustion in which the dissociation of water vapor is promoted by the presence of a catalyst. This catalyst is a glowing carbon. The presence of active oxygen is sufficient to activate the combustion process. A nozzle is used for the introduction of water vapor into the combustion chamber of the process.

The presence of lead in waste is a serious problem. Lead-containing waste is extremely toxic and must be carefully disposed of. In particular, during any high temperature disposal of lead, it is important to not create lead oxides.

It is an object of the present invention to provide a waste disposal system that removes lead from waste materials.

It is another object of the present invention to provide a waste disposal system that is inexpensive and economically beneficial.

It is a further object of the present invention to provide a waste disposal system in which leaded glass is created as a by-product.

These and other objects and advantages of the present invention will become apparent from a reading of the attached specification and appended claims.

SUMMARY OF THE INVENTION

The present invention is a process for the removal of lead from waste products that comprises the steps of: (1) delivering silica to a combustion chamber; (2) heating the silica to a temperature of greater than 1500° F.; (3) mixing a lead-containing waste with the heated silica so as to form a leaded glass; and (4) removing the leaded glass from the chamber. Typically, the silica is sand.

Since it is important to avoid the creation of lead oxides, the heating process is carried out in an oxygen-free environment. As such, the present invention includes the step of removing oxygen from the chamber prior to the step of heating. Oxygen is removed by injecting an inert gas into the chamber so as to displace oxygen from the chamber.

The silica is heated to a temperature suitable for forming molten glass. When the molten glass is mixed with the lead-containing waste, the lead will be filtered from the waste so as to form molten leaded glass. The molten leaded glass may then be cooled and removed from the combustion chamber. The remaining components of the waste are then dissociated by the high temperature combustion process of the present invention.

DETAILED DESCRIPTION OF THE INVENTION

Figure 1:
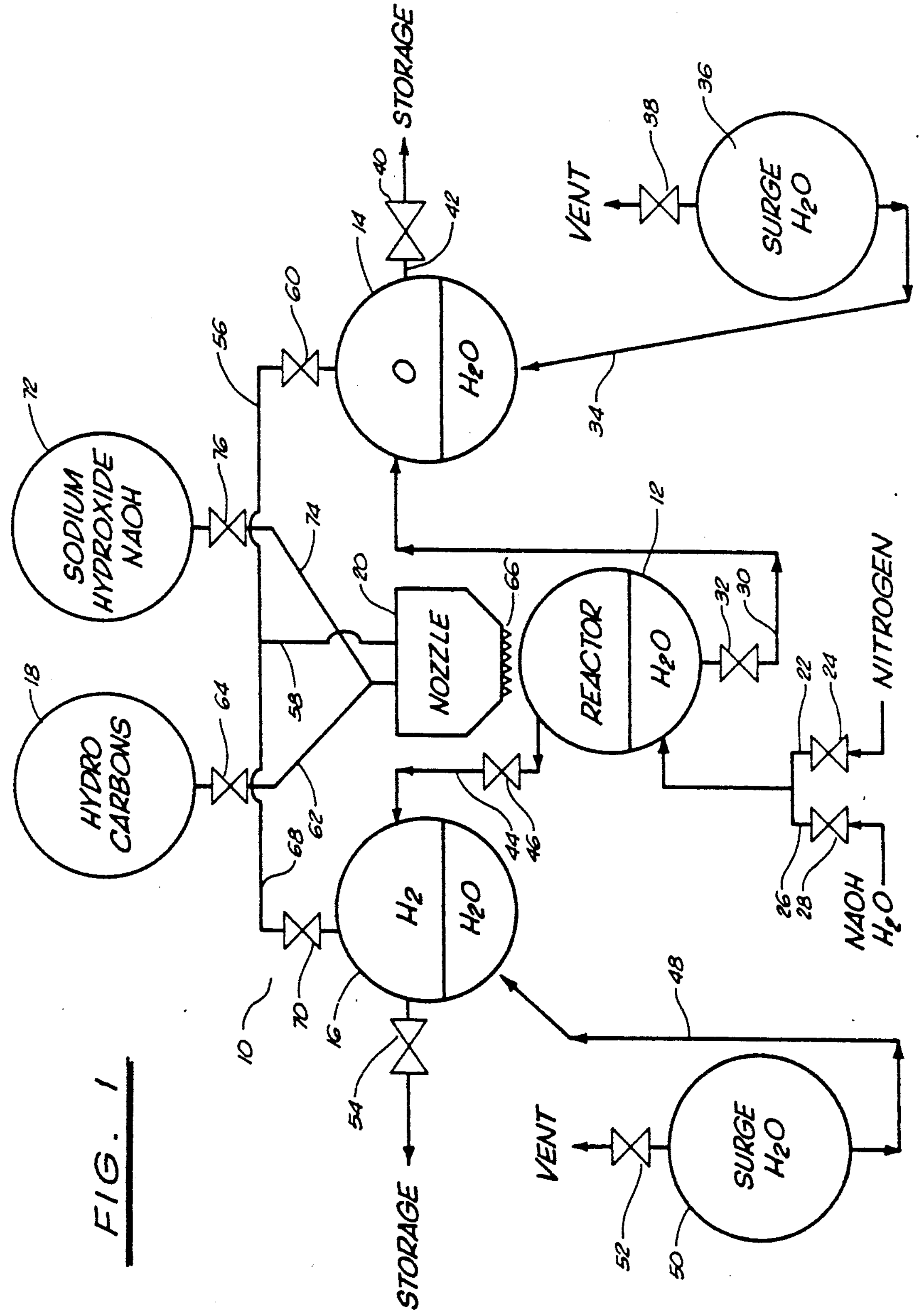
FIG. 1 is a block diagram showing the process of the heating system of the present invention.

Referring to FIG. 1, there is shown at 10 the system for heating a waste disposal system. The system 10 comprises a reactor chamber 12, an oxygen chamber 14, a hydrogen chamber 16, a source of hydrocarbons 18, and a nozzle 20. Each of these components interact so as to provide the economically attractive system for the heating of a waste disposal chamber.

Reactor 12 is a chamber suitable for the receipt of water. As illustrated in FIG. 1, reactor 12 can also be a combustion chamber in which waste products are delivered for combustion. Reactor 12 is a water-tight chamber of a suitable material for withstanding high temperatures. A nitrogen feed line 22 is in communication with the interior of reactor 12. Nitrogen is delivered into the interior of reactor 12 through control valve 24. Nitrogen is an inert gas that is utilized so as to displace any residual gases that may be found in reactor 12. It is important that the combustion process be carried out in an inert gas environment.

Another feed line 26 is also in communication with the interior of reactor 12. Feed line 26 delivers water through control valve 28. For the process of the present invention, water is delivered with nitrogen into the interior of reactor 12. After experimentation, it was found that the use of sodium hydroxide (NaOH) significantly "softens" the water. Without sodium hydroxide, water will dissociate at a temperature of approximately 4000°. However, in combination with sodium hydroxide, the water will react at a temperature of between 2000° and 3000°. It is fundamental to the present invention that the cost of creating heat goes up significantly with the amount of heat required. In the preferred embodiment of the present invention of the present invention, it is important that water be combined with the sodium hydroxide for delivery to the interior of the reactor chamber. However, it is also possible for the present invention to operate without the use of sodium hydroxide. The fundamental basis for the dissociation of water can occur with just water alone.

The reactor chamber 12 is initially heated, by induction heating methods, or otherwise, to a temperature of at least 2000° F. This temperature will cause the water to dissociate into its separate hydrogen and oxygen components. Because of the use of nitrogen within reactor 12, this dissociation occurs in an inert environment. Steam does not occur because of this inert environment. As such, the reaction carried out within reactor chamber 12 is a relatively clean reaction.

When the water dissociates into its hydrogen and oxygen components, the oxygen will migrate to the bottom of the reactor chamber 12 and the hydrogen will migrate to the top of the chamber. As such, the oxygen can be removed from reactor chamber 12 through line 30. When a suitable volume of oxygen is contained within reactor chamber 12. The oxygen will pass through open valve 32, through line 30, and into oxygen storage tank 14. Initially, oxygen storage tank 14 is filled with water. As oxygen is delivered through line 30, the water is displaced from the interior of the oxygen storage tank 14. Initially, it is important that water fills the oxygen storage tank 14 so as to maintain the purity of the interior of the oxygen storage tank. As the oxygen gas enters the storage tank 14, water passes from the interior of storage tank 14 through line 34 and into water surge tank 36. The water within surge tank 36 will continually interact with the contents of oxygen storage tank 14. As oxygen continues to be used in the process of the present invention, the water will travel from surge tank 36 into storage tank 14 so as to offset the removal of oxygen from the storage tank 14. Vent 38 communicates with surge tank 36 so as to remove any excess oxygen that may pass into the surge tank 36.

A storage valve 40 communicates with the interior of oxygen storage tank 14. When an excess of oxygen is accumulated within storage tank 14, then it may be desirable to remove the oxygen from storage tank 14 for separate storage. In this manner, oxygen can be delivered for use at a later time. Oxygen can also be delivered through storage valve 40 for the purpose of sale as a gas product. Molecular sieving can be utilized with line 42 for the purpose of removing the oxygen from storage tank 14.

The water within reactor 12 also dissociates into a hydrogen component. Hydrogen passes from the top of reactor 12 through line 44, into hydrogen storage tank 16. A valve 46 is interposed along line 44 so as to control the flow of hydrogen into the hydrogen storage tank 16.

The hydrogen storage tank 16 is initially filled with water. The use of the water to fill the hydrogen storage tank 16 maintains the purity of the gas contained within storage tank 16. As hydrogen is introduced into the interior of storage tank 16, the hydrogen displaces the water within tank 16. The water then passes from storage tank through line 48 into water surge tank 50. As with the oxygen storage tank, the water within the surge tank 50 will always interact with the interior of the hydrogen storage tank 16 depending on the quantity of hydrogen contained within storage tank 16 at any point in time. A vent line 52 interacts with surge tank 50 so as to remove any excess water or excess hydrogen that might occur within the surge tank 50.

After experimentation, it is found that the hydrogen within hydrogen storage tank 16 will be 90% pure. Suitable molecular sieves can be incorporated along storage line 54 so as to remove the pure hydrogen from the hydrogen storage tank 16.

As a gaseous product, hydrogen is very valuable. Hydrogen is one of the most marketable gases and most profitable gases among those sold on the market. As such, it is a valuable by-product of the present invention to provide sellable quantities of hydrogen. The hydrogen passes from the hydrogen storage tank 16, through valve 54, outwardly for storage for sale or later use. In this manner, both the oxygen by-product and the hydrogen by-product of the process of the present invention can be sold on the market as a gas. The present invention produces large quantities of oxygen and hydrogen during the dissociation of water. These gaseous products are produced in a most economical fashion.

As a result of experimental efforts, a most unique reaction was found. This reaction occurs when oxygen, under high pressure, comes into contact with hydrocarbons. When such contact oocurs, an extremely explosive reaction results. This produces a tremendous amount of heat. As a result of this experimental result, the system of the present invention was developed so as to provide an economical heat for the production of dissociated water or for the combustion of waste products. It was also found that the hydrocarbons that are used can be waste hydrocarbons.

The present invention takes advantage of this reaction by delivering oxygen from oxygen storage tank 14 through lines 56 and 58 into nozzle 20. Valve 60 is incorporated into line 56 so as to allow for the pressurized delivery of oxygen into nozzle 20. The experimental results, described herein previously, indicate that the oxygen should be pressurized to at least 1000 psi. As such, valve 60 can operate to deliver oxygen into line 56 whenever the pressure within oxygen storage tank 14 is at that 1000 psi level. The hydrocarbon source 18 is connected by line 62 to nozzle 20. Valve 64 can be actuated so as to cause the flow of the hydrocarbons from hydrocarbon source 18 through line 62 to nozzle 20. It is in nozzle 20 that the pressurized oxygen mixes with hydrocarbons under pressure. Nozzle 20 may be a venturi nozzle so as to further facilitate this mixing. As a result of the mixing, the explosive reaction occurs within nozzle 20 and results in a flame 66 directed to the reactor 12. As such, the products of the reaction carried out within reactor 12 assist in the heating of the reactor 12.

It has been found that the combination of pressurized oxygen and hydrocarbons produces an intense heat. However, in order to further intensify the heat of the reaction carried out within nozzle 20, additional fuel can be provided to the fire. It can be seen that line 68 is connected to hydrogen storage tank 16. Valve 70 can be used so as to deliver the hydrogen from storage tank 16 through line 68 into line 58 and then into nozzle 20. In this manner, the hydrogen can be mixed with pressurized oxygen and hydrocarbons to add further fuel to the fire 66 from nozzle 20. A source of sodium hydroxide 72 is also connected by line 74 to nozzle 20. Valve 76 controls the flow of sodium hydroxide as desired. Although it is not a requirement that sodium hydroxide be used for the purposes of the present invention, experimental results have indicated that the sodium hydroxide further intensifies the fire 66 from nozzle 20.

In FIG. 1, it can be seen that the system 10 greatly enhances the economics of combustion. First, a great deal of heating power is found in the use of the by-products of the dissociation of water. Water is a very inexpensive feed stock. Since water has explosive by-products (hydrogen and oxygen), such by-products are utilized for the full advantage of the present invention. Secondly, the hydrocarbons that are provided for the combustion process 10 can be relatively inexpensive waste hydrocarbons. For example, the sludge at the bottom of oil tankers could be used for the hydrocarbons of the present invention. A variety of other waste hydrocarbons could also be used. However, if it would be economic to use commercially available hydrocarbons, then the present invention could also utilize such non-waste hydrocarbons. It is believed that the use of gasoline or oil as the hydrocarbons would still be economical with the system of the present invention. Thirdly, the system 10 of the present invention enhances the economics of the system by providing pure oxygen and pure hydrogen for later sale. The sale of such hydrogen and oxygen offset the operating costs of the present invention. In fact, it is believed that the sale of the hydrogen by-products of the dissociation of water can reap greater economic returns than the operating costs of the system itself. In these ways, the present invention offers an economic system for the destruction of waste.

Figure 2:
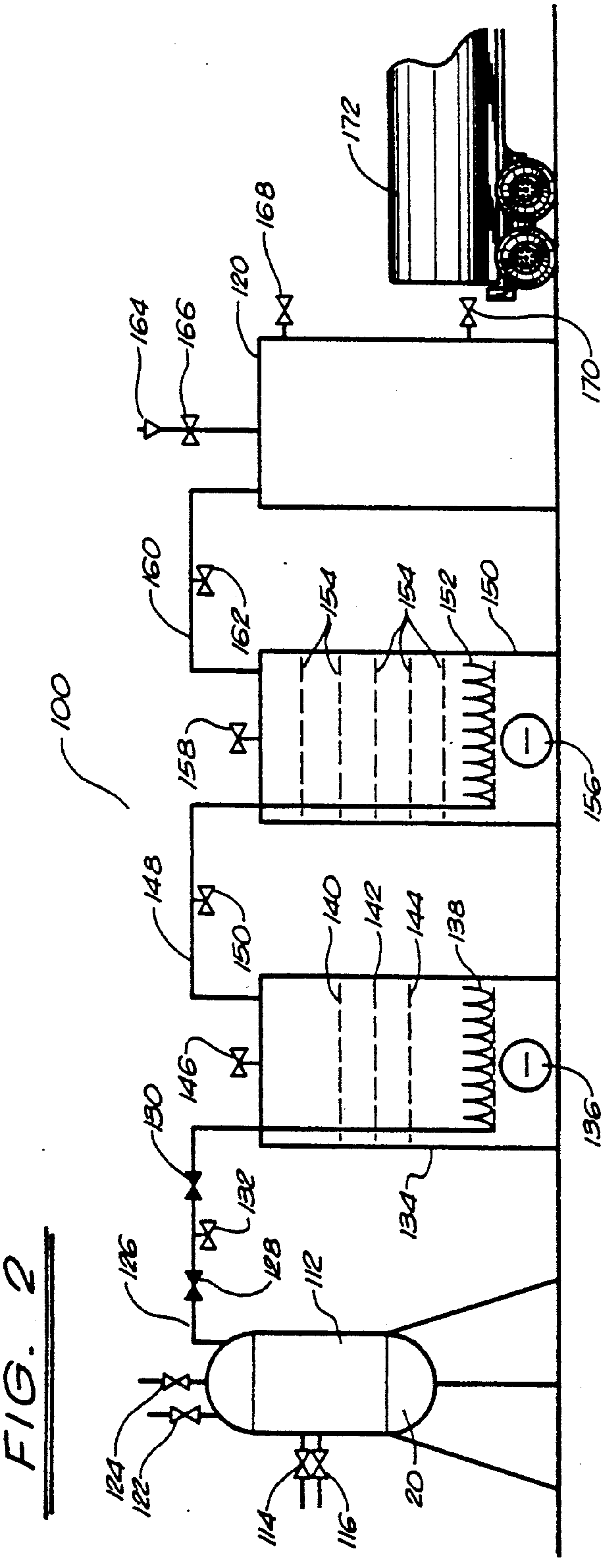
FIG. 2 is a schematic representation of the process and apparatus for the disposal of waste.

Referring to FIG. 2, there is shown at 100 a waste disposal system that utilizes the aforementioned system 10. Specifically, nozzle 20 of FIG. 1 is utilized in the waste disposal system 100 for the destruction and disposal of waste products. Specifically, in FIG. 2, the waste disposal system 100 includes a sealed container 112, a waste delivery channel 114, an inert gas injector 116, the heat producing nozzle 20, and a storage vessel 120.

Sealed container 112 is the apparatus that receives the waste. Sealed container 112 acts as the receptacle for the waste and for the gasifying of such waste. As described herein, the container 112 is "sealed" since container 112 is part of a closed system.

The sealed container 112 receives waste into its interior from the waste transport channel 114. The sealed container 112 can be considered the combustion chamber of the present process. The waste transport channel 114 can be used to deliver sand, or silica, into the interior of the chamber. The waste transport channel also delivers the lead-containing waste into the sealed container 112. In keeping with the present invention, the passage of the silica into the chamber can be carried out by the same waste transport channel 114 or by a separate channel. Also, the silica can be mixed with the lead-containing waste prior to delivery into the interior of sealed container 112. In this manner the waste transport channel 114 would pass a slurry of the silica and lead-containing waste into the interior of the sealed container 112.

The inert gas injector 116 is positioned so as to communicate with the interior of the sealed container 112 in a valved relationship. Specifically, the inert gas injector may be selectively activated so as to fill the container 112 with nitrogen and to expel any oxygen remaining within the container 112. Typically, nitrogen is the inert gas that may be injected into the interior of container 112. This nitrogen can be provided from a separate source or can be provided from the same source as the nitrogen that supplies the reactor 12 of FIG. 1.

The nozzle 20 is a heater of the same type as the nozzle 20 of FIG. 1. In FIG. 1, it is represented that nozzle 20 acts directly on the reactor 12 so as to dissociate water. Importantly, in keeping with the present invention, the nozzle 20 can also be used conjunctively or disjunctively for the purpose of the destruction of waste within sealed container 112. As such, the present invention provides the most economic and efficient method for the heating of the sealed container 12, and thus, enhances the system 100 for the disposal of waste. In other words, the heating system 10 of FIG. 1 is utilized for the purpose of efficiently destroying waste within sealed container 112.

In order to effectively filter the lead-containing waste within sealed container 112, it is necessary that nozzle 20 cause the interior of sealed container 112 to exceed 1500° F. in temperature. The nozzle 20 is shown as positioned beneath the sealed container 12. However, in alternative embodiments of the present invention, the nozzle 20 may be positioned elsewhere. The only important requirement of the heating provided by nozzle 20 is that it generate a suitable temperature in an oxygen-free environment so as to gasify any waste delivered into the interior of container 112. A thermocouple 122 is connected to the container 112 so as to monitor the interior temperature of container 112. Thermocouple 122 is any of a variety of suitable pyrometers that have the capacity to measure temperatures in excess of 1500° F. Oxygen analyzer 124 is also connected to container 112 so as to measure the oxygen content of the atmosphere within container 112. Since it is important to the present waste disposal system that the destruction of waste occur in an oxygen-free environment, the oxygen analyzer 124 is required so as to provide an indication of when the oxygen is effectively purged from the interior of container 112.

Line 126 communicates with the interior of sealed container 112 so as to cause the gaseous composition produced by the dissociation of the waste materials to pass from container 112. After the liquid waste has been effectively dissociated within container 112, the resulting complex composition of gases will pass outwardly from the container 112 through line 126. Temperature gage 128 and pressure gage 130 are positioned on line 126 to appropriately monitor the environmental conditions. A sampler 132 is also provided along line 126 so as to monitor and sample the gases passing through line 126. Since the composition of the liquid waste introduced into container 112 can have a wide variety of components, it is useful and necessary to monitor the complex composition of the gas as it passes through line 126. Line 126 extends from the container 112 to a water filter 134. Water filter 134 includes an access opening 136 that can be utilized so as to access the interior of water filter 134 and so as to remove any solid materials that are filtered from the gaseous composition. Initially, the gaseous composition is aerated by aerator 138. Aerator 138 causes a wide distribution of the gaseous composition to pass evenly through water filter 134. A plurality of stainless steel screens 140, 142, and 144 are positioned within water filter 138 such that the gaseous composition, as aerated, will flow upwardly through water filter 138 and pass through stainless steel screens 140, 142 and 144. Stainless steel screens 140, 142 and 144 serve to trap and remove sulphur and other particulate matter that may reside within the gaseous composition passing through water filter 134. Water filter 134 causes the carbon black, the carbon dioxide, and the carbon monoxide of the gaseous composition to mix with the water so as to become carbonic acid and carbon black in solution. It also serves to cool the gaseous composition passing therethrough. A vent 146 is provided so as to prevent any pressure build-up.

The water filtered gaseous composition then passes from water filter 134 into pipe 148. Pipe 148 is a stainless steel pipe that has a sufficient capacity to allow the gaseous composition to pass freely therethrough. A sampler 150 is connected to pipe 148 so as to allow samples to be taken of the gaseous composition passing through pipe 148. Pipe 148 extends into sodium hydroxide filter 150. The gaseous composition from pipe 148 is aerated by aerator 152 such that the gaseous composition will pass from aerator 152 upwardly through sodium hydroxide filter 150. A plurality of stainless steel screens 154 are positioned across the sodium hydroxide filter 150 so as to remove sulphur and other particulate matter from the gaseous composition. As the gaseous composition passes through the sodium hydroxide solution within the sodium hydroxide filter 150, the chlorine in the gaseous composition will be converted into a salt. The salt, in solid form, may be removed, as needed, through access opening 156 in sodium hydroxide filter 150. A vent 158 is provided on sodium hydroxide filter 150 so as to prevent problems from pressure build-up.

After the gaseous composition has passed through the sodium hydroxide solution within the sodium hydroxide filter 150, the gaseous composition will pass into pipe 160. Pipe 160 is a stainless steel pipe that extends from the sodium hydroxide filter 150 to storage tank 120. Storage tank 120 receives the gaseous composition, as filtered, from pipe 160. A sampler 162 is provided on pipe 160 so as to allow the operator of the system to take periodic samples of the gaseous composition passing through pipe 160. Storage tank 120 includes a flare 164 or a secondary source for heat. Storage tank 120 also includes a pressure release valve 166 so as to prevent unnecessary pressure build-up. A sampler 168 is provided on the storage tank 120 so as to allow the operator of the system to take periodic samples of the gaseous composition contained within storage tank 120.

Storage tank 120 includes the gaseous composition having many compounds. In their combined form, these gases are relatively valueless. However, a molecular sieve 170 is connected to the storage tank 120 so as to allow the gases to be separated and removed from storage tank 120. The molecular sieve 170 allows the gases to be separated into their individual components. For example, molecular sieve 170 may be of a type that only allows ethylene to pass therethrough and from storage tank 120. As can be seen in FIG. 1, such a selected gas will then pass into a tanker truck 172 so as to be shipped and sold to a designated location. Tanker truck 172 can be utilized for a single gas or can be a multiple container truck for receiving an assortment of separated gases. The ability to produce and sell the gases resulting from the process of the present invention allows the process to be economical. Ultimately, the value of the gases produced from the initial waste should exceed the cost of operating the system of the present invention.

The operation of the waste disposal system 100 is as follows. First, the lead-containing waste is pumped, by way of pipe 114, into the interior of chamber 112. Also, by way of pipe 114, or by another conduit, sand is delivered into the interior of container 112. Suitable means are provided for mixing the lead-containing waste material with the sand. The oxygen within container 112 is purged by introducing an inert gas through line 116 into the interior of container 112. As the inert gas (e.g. nitrogen) is injected into the container 112, the oxygen will pass from the interior of the container. Alternatively, the oxygen can be expelled from the container 112 as the nitrogen is being introduced. While the inert gas is being injected into container 112, the oxygen content of the interior of container 112 is continually monitored by oxygen analyzer 124. Additionally, the temperature of the interior of container 112 is monitored by thermocouple 122.

Heat is applied to the interior of container 112 by the process 10 of FIG. 1. Specifically, and ideally, the interior of container 112 will be heated to a temperature of greater than 1500° F. After experimentation, it was found that the heat produced by the interaction of pressurized oxygen with hydrocarbons can produce such a temperature within container 112. The temperature of greater than 1500° F. allows for the silica to become molten. In the molten state, the silica will mix with the lead-containing waste product so as to filter the lead from the waste product. Essentially the lead will join with the molten silica so as to form leaded glass. High temperatures within container 112 in the range of 2700° to 3500° F. allows all of the remaining components of the lead-containing waste product to become dissociated and converted into gaseous compositions. Since the waste is being gasified in an oxygen-free environment, the oxygen is not available to cause pollution. Specifically, lead oxides are not produced by the removal of lead from the lead-containing waste.

By the waste disposal process 100, carbon dioxide, carbon monoxide, chlorine and sulphur dioxides are not released. Inert gases do not combine with dissociated molecules so as to form pollutants. Since the container 112 is operated at superhigh temperatures, there is no possibility of clinkers being produced. Any deleterious material, such as polychlorinated biphenyl, which is considered difficult to decompose, is completely decomposed into a harmless gas. Nitrogen oxide is not produced because of the operation of the system in an oxygen-free environment. Within this disposal system, there is no oxygen existing in the system, except for that brought in with the waste charged into the container. If there is any oxygen that is produced by this waste disposal process, then it is very low in concentration. Since oxygen reacts with hydrocarbons and with hydrogen sooner than with nitrogen, no nitrogen monoxide will be produced.

The lead removal process of the present invention causes molten silica to mix and absorb the lead of the lead-containing waste. After the lead has joined with the molten silica, the molten material may be cooled. Once it is cooled, leaded glass is formed. The leaded glass can then be removed from container 112. After the leaded glass is removed from container 112, the leaded glass may then be sold as a useful by-product of the process of the present invention. Leaded glass has a high market value and significantly offsets the cost of operating the system of the present invention. The remaining components of the original lead-containing waste can then be heated to high temperatures and dissociated into the gaseous constituents.

When the gaseous composition has been produced by the superhigh temperatures of container 112, the gas passes through water filter 134 so as to remove a portion of the carbon content of the gas. The gaseous composition is then passed from the water filter 134 through a sodium hydroxide filter 150 so as to remove a portion of the chlorine component of the gas. Ideally, the resultant solids produced by these filtering processes can be removed through the access openings 136 and 156 of the respective filters.

The remaining gaseous composition then passes into storage vessel 20. Storage vessel 20 has equipment with appropriate molecular sieves so as to allow the removal of the specific gases of the gaseous composition.

In experiments conducted with this process, readings were taken of the resultant gas composition that would pass into the storage vessel 20 of the process of the present invention. Table I, hereinbelow, shows a breakdown of the gas composition. Of particular note, no oxygen was detected as part of the composition. Importantly, very valuable gases, such as methane, propane, and ethylene, were produced by the burning of a liquid organic waste.

TABLE I

| | |
|---|---|
| HYDROGEN | 34.60 Mol. % |
| CARBON DIOXIDE | 6.22 Mol. % |
| ETHYLENE | 8.52 Mol. % |
| ETHANE | 2.35 Mol. % |
| ACETYLENE | 0.15 Mol. % |
| OXYGEN | NONE DETECTED |
| NITROGEN | 0.70 Mol. % |
| METHANE | 25.53 Mol. % |
| CARBON MONOXIDE | 6.22 Mol. % |
| PROPANE PLUS | 15.71 Mol. % |

Another analysis was conducted of the burning of garbage introduced into the container. Table II shows the specific breakdown of the resultant gases that would be found in the storage vessel 120. In Table II, it can be seen that valuable gases, such as ethylene, methane and propane, were produced from the process of the present invention.

TABLE II

| | |
|---|---|
| HYDROGEN | 30.291 Mol. % |
| CARBON DIOXIDE | 14.187 Mol. % |
| ETHYLENE | 8.064 Mol. % |
| ETHANE | 0.913 Mol. % |
| ACETYLENE | 0.429 Mol. % |
| HYDROGEN SULFIDE | NONE DETECTED |
| OXYGEN | NONE DETECTED |
| NITROGEN | 0.477 Mol. % |
| METHANE | 10.802 Mol. % |
| CARBON MONOXIDE | 26.254 Mol. % |
| PROPANE PLUS | 8.583 Mol. % |

It can be seen that this waste disposal system achieves a pollution-free destruction of waste. Since the destruction of the waste occurs in an oxygen-free environment, there is no pollution to be released into the atmosphere. Furthermore, the production of valuable gases from the process of the present invention allows such gases to be sold separate and apart from the destruction process itself. The value of such gases economically offsets the cost of the operation of the waste destruction system of the present invention. In prior art systems, the heat necessary to gasify the waste would be too costly for economic consideration. In the present invention, this cost is minimal and is greatly offset by the value of the produced gaseous by-products of the process.

The foregoing disclosure and description of the invention is illustrative and explanatory thereof, and various changes in the method steps, as well as in the details of the illustrated apparatus, may be made within the scope of the appended claims without departing from the true spirit of the invention. The present invention should be limited by the following claims and their legal equivalents.

I claim:

1. A process for the removal of lead from a waste product comprising the steps of:
 delivering silica to a chamber;
 removing oxygen from said chamber;
 heating said silica in said chamber to a temperature of greater than 1500° F.;
 combusting a lead-containing waste within said chamber;
 mixing the combusted lead-containing waste with the heated silica so as to form a leaded glass; and
 removing said leaded glass from said chamber.

2. The process of claim 1, said silica being sand.

3. The process of claim 1, said step of removing oxygen comprising:
 injecting an inert gas into said chamber so as to displace oxygen from said chamber.

4. The process of claim 1, said step of heating comprising:

heating said silica to a temperature suitable for forming molten glass.

5. The process of claim 1, further comprising the step of:

dissociating the components of the lead-removed waste into gaseous constituents.

6. A process for the filtering of lead comprising:

mixing sand with a lead-containing waste product;

delivering the mixture to a combustion chamber;

removing oxygen from said combustion chamber;

combusting the mixture within said combustion chamber;

heating the mixture in said combustion chamber to a temperature of greater than 1500° F. so as to form a molten material; and removing said molten material from said combustion chamber.

7. The process of claim 6, said molten material being leaded glass.

8. The process of claim 6, said step of removing oxygen comprising:

injecting an inert gas into said chamber so as to displace oxygen from said chamber.

9. The process of claim 6, further comprising the step of:

cooling said molten material within said combustion chamber so as to form leaded glass.

10. The process of claim 6, further comprising the step of:

dissociating the lead-removed waste product; and filtering the gaseous components of the dissociated waste product.

* * * * *